United States Patent Office 3,357,975
Patented Dec. 12, 1967

3,357,975
7α-MONO- AND DIHALOMETHYLESTRA-4,9(10)-DIENES AND 4,9(10),11-TRIENES AND THEIR PREPARATION
Colin C. Beard, Boulder, Colo., and Alexander D. Cross, Mexico City, Mexico, assignors to Syntex Corporation, Panama, Panama, a corporation of Panama
No Drawing. Filed Feb. 3, 1966, Ser. No. 524,870
19 Claims. (Cl. 260—239.55)

ABSTRACT OF THE DISCLOSURE

7α-monohalomethyl and 7α-dihalomethyl estra-4,9(10)-dienes having a hydroxyl, tetrahydropyranyloxy, or hydrocarbon carboxylic acyloxy group at C–17β and a keto, tetrahydropyranyloxy or hydrocarbon carboxylic acyloxy group at C–3, which are optionally substituted at C–17α with a hydrocarbon substituent and/or at the C–18 position with a methyl group and/or which are optionally unsaturated between the C–11 and C–12 positions, are anabolic, progestational and fertility control agents.

This is a continuation-in-part of Serial No. 486,226, filed September 9, 1965.
This invention relates to novel steroids and to their preparation. This invention is especially directed at compounds represented by the formula:

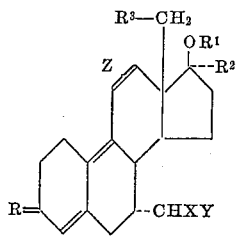

wherein R represents an oxygen atom or the group

in which $R^4$ represents hydrogen, tetrahydropyranyl, or a hydrocarbon carboxylic acyl group;
$R^1$ represents hydrogen, tetrahydropyranyl, or a hydrocarbon carboxylic acyl group;
$R^2$ represents hydrogen, cyclopropyl, (lower)alkyl, (lower)alkenyl, (lower)alkynyl, or a halo(loweralkynyl group;
$R^3$ represents hydrogen or methyl;
Z represents a carbon-carbon single bond or a carbon-carbon double bond;
X represents hydrogen, chloro, or fluoro; and
Y represents chloro or fluoro.
By the term (loweralkyl and derivations thereof such as halo(lower)alkynyl is meant a monovalent, branched or straight-chain aliphatic radical, containing 6 or less carbon atoms. Thus, typical members of such (lower)alkyl groups are methyl, ethyl, propyl, butyl, pentyl, and hexyl; of such (lower)alkenyl groups are vinyl, propenyl, and the like; of such (lower)alkynyl groups are ethynyl, propynyl, and the like; and of such halo(lower)alkynyl groups are chloroethynyl, chloropropynyl, and the like.
By the term hydrocarbon carboxylic acyl group is intended an acyl group containing less than 12 carbon atoms thereby providing such ester groups as acetate, propionate, trimethylacetate, haloacetate, aminoacetate, benzoate, adamantoate, and the like.
The novel steroids of this invention except those in which $R^2$ is alkynyl are anabolic agents and are effective in the treatment of debilatory conditions such as are encountered in old age, post-operative recuperation, and the like. Those compounds in which $R^2$ is alkynyl, particularly ethynyl and haloethylnyl, are progestational agents and are accordingly useful for the control and regulation of fertility.

The compounds of this invention are provided by a sequence of steps which will be more completely described hereinafter from compounds represented by the formula

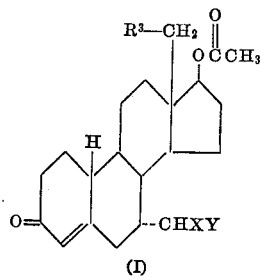

wherein $R^3$ is as previously defined. Such compounds are prepared by a process described as part of Serial No. 513,548 filed December 13, 1965.

The following scheme illustrates one useful method of treating the starting steroids represented above preliminary to molecular elaboration at C–3 and C–17.

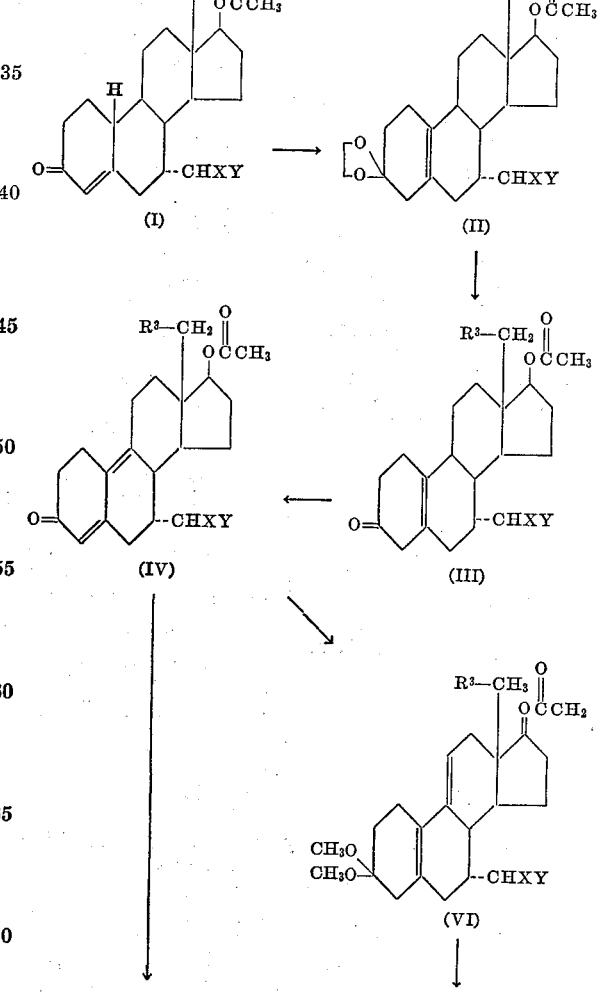

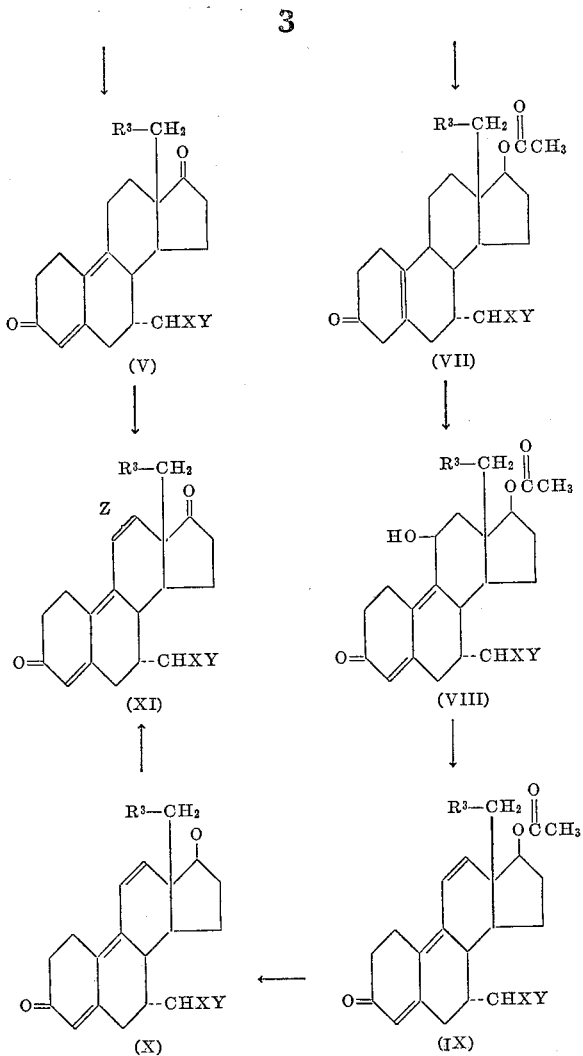

wherein R³, Z, X, and Y are as previously set forth.

Referring to the scheme set forth above, treatment of the Δ⁴-19-nor-3-keto steroid (I) with ethylene glycol in the presence of p-toluenesulfonic acid or other strong acid produces the Δ⁵⁽¹⁰⁾-3-ketal (II) with trace amounts of the corresponding Δ⁵⁽⁶⁾ tautomer which is readily separated from the principal product via chromatography. The 3-ketal group is then removed by mild treatment such as is provided by magnesium sulfate in boiling benzene or aqueous oxalic acid in methanol at room temperature to give (III).

The Δ⁵⁽¹⁰⁾-3-keto-steroid (III) is treated such as with bromine in pyridine solution or with pyridine perbromide hydrobromide to yield the 4,9(10)-diene (IV). This method is described in J.A.C.S. 82, 2402 (1960). Thereafter, the 17β-acetoxy group can be hydrolyzed with base and oxidized with chromic oxide to the corresponding 17-keto compound (V) which provides one group of compounds represented by (XI).

A compound containing a third conjugated double bond between carbons 11 and 12 is provided by initially forming the dimethyl ketal (VI) containing rearranged unsaturation such as by treatment with methanol acidified with hydrogen chloride. The 3-keto group is restored upon hydrolysis such as with 8% sulfuric acid in acetone. The resultant compound (VII) is converted to the 4,9(10)-dien-11-ol (VIII) by a sequence comprising treatment in basic solution (such as is provided by pyridine, quinoline, or the like) under oxidizing conditions (such as is provided by oxygen, air, or other oxidative source) followed by the action of an alkali metal iodide. The double bond between carbons 11 and 12 is then introduced by dehydration such as by treatment with mesyl chloride and pyridine in dimethylformamide giving (IX). Thereafter, the 17β-acetoxy group is hydrolyzed and oxidized as described above to give the 3,17-dione (X) which provides another group of compounds represented by (XI).

The compounds represented by (XI), supra, are further elaborated as follows to provide the novel steroids contemplated herein.

The 3-keto group is selectively protected by converting it to the 3-ketal by treatment with ethylene glycol in benzene in the presence of oxalic acid at reflux. Thereafter, the 17-keto compounds may be treated with an organo-metallic such as alkyl lithium, alkenyl lithium, alkynyl lithium or alkyl magnesium halide, alkenyl magnesium halide, or alkynyl magnesium halide which provides the corresponding 17α-aliphatic-17β-ols. The 17α-alkyl or alkenyl groups such as ethyl or vinyl may be alternatively provided through controlled hydrogenation of the 17α-alkynyl group such as ethynyl. The 17α-vinyl may in turn be converted to 17α-cyclopropyl upon treatment with an iodo methyl metal iodide such as is provided by combination of methylene iodide and zinc-copper couple.

In lieu of the process described above, the 17-keto may be reduced such as by treatment with sodium borohydride in methanol or lithium aluminum hydride in tetrahydrofuran to give the corresponding 17β-hydroxy compound, unsubstituted in the 17α-position.

The secondary 17β-ols may be esterified by an acylating agent such as acetic anhydride in pyridine. Esterification of the tertiary 17β-hydroxyl is done with an acylating agent in the presence of an acid such as p-toluenesulfonic acid and the like. Etherification of the 17β-hydroxyl with dihydropyran in the presence of p-toluenesulfonic acid affords the 17β-tetrahydropyranyl ether.

The protecting group at C-3 is removed in the usual manner such as by acidic treatment to afford the corresponding 3-keto compound, fully substituted at C-17 as provided above.

This 3-keto group may also be reduced such as with sodium borohydride as described above for the 17-keto to give the 3β-hydroxyl. This secondary allylic hydroxyl may be esterified as described above to afford the 3β-ester or it may alternatively be etherified with dihydropyran in the presence of p-toluene-sulfonyl chloride to give the 3β-tetrahydropyranyl ether.

The following preparation and examples serve to illustrate the invention more fully but are not intended to be limiting except insofar as provided in the appended claims.

Preparation

To a stirred, refluxing solution of 1 g. of estra-4,6-diene-3,17-dione in 15 ml. of dimethyl triethylene glycol ether is added in a dropwise fashion a 50% w./v. solution of sodium trifluoroacetate in dimethyl triethylene glycol ether. When the further addition of reagent fails to effect a change in the U.V. spectrum, the addition is stopped. The mixture is cooled and filtered. The filtrate is evaporated to dryness and the residue is chromatographed on alumina with methylene chloride to yield 6α,7α-difluoromethyleneestr-4-ene-3,17-dione.

In a like manner, 6α,7α-difluoromethylene-18-methyl-estr-4-ene-3,17-dione is prepared.

By substituting sodium trichloroacetate in the procedure of this example, there is obtained the corresponding 6α,7α-dichloromethylene derivatives. Likewise, the use of sodium chlorofluoroacetate results in the monofluoro derivatives namely, 6α,7α-fluoromethyleneestr-4-ene-3,17-dione and 6α,7α-fluoromethylene-18-methylestr-4-ene-3,17-dione.

A stirred solution of 16 g. of 6α,7α-difluoromethylene-estr-4-ene-3,17-dione in 5 ml. of acetic acid is heated at reflux for 1 hour with several portions of zinc dust. The mixture is then stirred at room temperature for 1 hour, filtered, the residue being washed with acetic acid, and diluted with 10 ml. of water. This mixture is extracted with methylene chloride and the methylene chloride extracts are in turn washed with water, 2 N sodium bicarbonate solution, and water. After drying this organic solution with magnesium sulfate, it is evaporated to dryness and chromatographed on alumina with hexane:methylene chloride followed by methylene chloride:ethyl acetate to yield 7α-difluoromethylestr-3,17-dione.

In a like manner, the use of zinc-copper couple in methanol or zinc dust in tetrahydrofuran in lieu of zinc dust in acetic acid affords the same result.

By following the ring opening procedure described above, 7α-difluoromethyl-18-methylestr-4-ene-3,17-dione; 7α-dichloromethylestr-4-ene - 3,17 - dione; and 7α-chloromethyl-18-methylestr-4-ene-3,17-dione are also prepared.

To a suspension of 1 g. of 7α-difluoromethylestr-4-ene-3,17-dione in 7.5 ml. of anhydrous, peroxide-free dioxane are added 1.2 ml. of freshly distilled ethyl orthoformate and 0.8 g. of p-toluenesulfonic acid. The mixture is stirred at room temperature for 15 minutes and allowed to stand at room temperature for 30 minutes. There is then added 0.8 ml. of pyridine, followed by water until a solid forms. The solid then formed is collected by filtration, washed with water and air dired to yield 3-ethoxy-7α-difluoromethylestra-3,5(6)-dien-17-one which is crystallized from acetone:hexane.

A solution of 1 g. of sodium borohydride in 3 ml. of water is added to an ice-cooled solution of 1 g. of 3-ethoxy-7α-difluoromethylestra-3,5(6)-dien-17-one in 120 ml. of methanol and the mixture is then allowed to stand for 16 hours at room temperature. The excess reagent is decomposed by addition of acetic acid and the solution is then concentrated to a small volume in vacuum and diluted with water. The product is extracted with ethyl acetate and these extracts are washed with water, dried and evaporated to yield 3-ethoxy-7α-difluoromethylestra-3,5(6)-dien-17β-ol which may be further purified by recrystallization from acetone:hexane.

To a solution of 1 g. of 3-ethoxy-7α-difluoromethylestra-3,5(6)-dien-17β-ol in 10 ml. of acetone are added a few drops of 36% hydrochloric acid. The mixture is heated a few minutes at steam bath temperatures, diluted with water and filtered. The solid thus collected is dried and recrystallized from acetone:hexane to yield 7α-difluoromethylestr-4-en-17β-ol-3-one.

A mixture of 1 g. of 7α-difluoromethylestra-4-en-17β-ol-3-one, 4 ml. of pyridine, and 2 ml. of acetic anhydride is allowed to stand at room temperature for 15 hours. The mixture is then poured into ice water and the solid which forms is collected by filtration, washed with water and dried to yield 7α-difluoromethyl-17β-acetoxyestr-4-en-3-one which may be further purified through recrystallization from acetone:hexane.

Similarly prepared is 7α-difluoromethyl-17β-acetoxy-18 - methylestr - 4 - en - 3 - one from 7α - difluoromethyl-18-methylestr-4-ene-3,17-dione.

*Example 1*

A mixture of 1 g. of 7α-difluoromethyl-17β-acetoxyestr-4-en-3-one, 25 ml. of dry benzene, 5 ml. of ethylene glycol, and 50 g. of p-toluenesulfonic acid monohydrate is refluxed for 16 hours using a water separator. The reaction mixture is then washed with aqueous sodium bicarbonate solution and water, dried, and evaporated to dryness to yield 3,3-ethylendioxy-7α-difluoromethyl-17β-acetoxyestr-5-(10)-ene which is recrystallized from acetone: hexane and separated from trace amounts of its Δ5(6) tautomer via chromatography.

Likewise prepared is 3,3 - ethylenedioxy - 7α - difluoromethyl-17β-acetoxy-18-methylestr-5(10)-ene.

*Example 2*

To a solution of 1.0 g. of 3,3-ethlyenedioxy-7α-difluoromethyl-17β-acetoxyestr-5(10)-ene in 50 ml. of benzene is added 0.2 g. of magnesium sulfate. The mixture is heated at reflux for 40 minutes, neutralized with a saturated aqueous sodium carbonate solution, concentrated under reduced pressure to about 20 ml. and poured into water. The solid which forms is collected by filtration, washed well with water, and dried to yield 7α-difluoromethyl-17β-acetoxyestr-5(10)-en-3-one which may be recrystallized from acetone.

Likewise, 7α - difluoromethyl - 17β - acetoxy - 18-methylestr-5(10)-en-3-one is prepared from 3,3-ethylenedioxy - 7α - difluoromethyl - 17β - acetoxy - 18 - methylestr-5(10)-ene.

*Example 3*

To a solution of 0.2 g. of 7α-difluoromethyl-17β-acetoxyestr-5(10)-en-3-one in 4 ml. of pyridine is added 1.1 g. of pyridine perbromide hydrobromide. The mixture is stirred at room temperature for 7 hours after which time it is partitioned between water and ethyl acetate and the organic phase separated. This is washed successively with dilute hydrochloric acid, dilute sodium bicarbonate solution, dried and evaporated. The resultant solid is chromatographed on alumina eluting with benzene:ether and pure benzene to give 7α-difluoromethyl-17β-acetoxyestra-4,9(10)-dien-3-one.

Similarly, 7α - difluoromethyl - 17β- acetoxy - 18-methylestra-4,9(10)-dien-3-one is prepared.

*Example 4*

A solution of 1 g. of 7α-difluoromethyl-17β-acetoxyestra-4,9(10)-dien-3-one in 50 ml. of methanol is heated at reflux for 3 hours with a solution of potassium hydroxide in 1 ml. of water. The reaction mixture is then poured into ice water and the solid which forms collected by filtration, washed with water to neutrality and dried to yield 7α - difluoromethylestra - 4,9(10) - dien - 17β - ol-3 - one which is recrystallized from methylene chloride: ether.

A solution of 6 g. of 7α-difluoromethylestra-4,9(10)-dien-17β-ol-3-one in 120 ml. of pyridine is added to a mixture of 6 g. of chromic trioxide in 20 ml. of pyridine. The reaction mixture is allowed to stand at room temperature for 15 hours, diluted with ethyl acetate and filtered through Celite diatomaceous earth. The filtrate is washed well with water, dried and evaporated to dryness to yield 7a - difluoromethylestra - 4,9(10) - diene - 3,17 - dione which may be further purified by recrystallization from acetone:hexane.

7α - difluoromethyl - 18 - methylestra - 4,9(10) - diene-3,17-dione is also prepared by the procedures of this example from 7α - difluoromethyl - 17β- acetoxyestra - 4,9 (10)-dien-3-one.

*Example 5*

A mixture of 0.5 g. of 7α-difluoromethyl-17β-acetoxyestra-4,9(10)-dien-3-one in 25 ml. of methanol is saturated with dry hydrogen chloride gas and allowed to stand at room temperature for 15 hours and is then poured into water. This mixture is extracted with methylene chloride and the extracts are in turn washed with water to neutrality, dried over sodium sulfate, and evaporated to dryness to yield 3,3 - dimethoxy - 7α - difluoromethyl - 17β-acetoxyestra-5(10),9(11)-diene which may be recrystallized from acetone:hexane.

A solution of 2.0 g. of 3,3-dimethoxy-7α-difluoromethyl-17β-acetoxyestra-5(10)-,9(11)-diene in 70 ml. of acetone and 7 ml. of 8% aqueous sulfuric acid is allowed to stand at room temperature for 15 hours, neutralized with a saturated aqueous sodium carbonate solution, concentrated under reduced pressure to about 20 ml., and poured into water. The solid which forms is collected by filtration, washed well with water, and dried to yield 7α-difluoromethyl - 17β - acetoxyestra - 5(10),9(11) - dien - 3 - one which may be recrystallized from acetone.

Likewise, 7α - difluoromethyl - 17β - acetoxy - 18-methylestra-5(10),9(11)-dien-3-one is prepared from 7α-difluoromethyl-17β-acetoxyestra-4,9(10)-dien-3-one.

Example 6

A solution of 0.5 g. of 7α-difluoromethyl-17β-acetoxyestra-5(10),9(11)-dien-3-one in 12.5 ml. of pyridine is stirred at room temperature for 3 days. Evaporation of solvent leaves a solid residue. One gram of sodium iodide is added to a solution of this solid in 20 ml. of methanol and 10 ml. of acetic acid and the mixture is allowed to stand at room temperature for 30 minutes, aqueous sodium thiosulfate is added followed by water and the mixture is extracted with methylene chloride to yield 7α-difluoromethyl - 17β - acetoxyestra - 4,9(10) - dien - 11β-ol-3-one which is further purified by crystallization from acetone:hexane.

Likewise prepared is 7α - difluoromethyl - 17β - acetoxy - 18 - methylestra - 4,9(10) - dien - 11β - ol - 3 - one.

Example 7

One gram of 7α - difluoromethyl - 17β - acetoxyestra-4,9(10)-dien-11β-ol-3-one is dissolved with slow heating in 12.5 ml. of dimethylformamide. To the cooled mixture is then added 0.42 g. of methanesulfonyl chloride and 0.5 ml. of pyridine. After heating the reaction mixture at 80° C. for 30 minutes it is cooled, diluted with water and extracted with ethyl acetate. The extracts are washed with water, dried over sodium sulfate, and evaporated to yield 7α - difluoromethyl - 17β - acetoxyestra - 4,9(10),11-trien-3-one which may be further purified by recrystallization from acetone:hexane.

7α-difluoromethyl-17β - acetoxy - 18 - methylestra - 4,9(10),11-trien-3-one is likewise prepared following the procedure of this example.

Example 8

A solution of 1 g. of 7α-difluoromethyl-17β-acetoxyestra-4,9(10),11-trien-3-one in 50 ml. of methanol is heated at reflux for 3 hours with a solution of potassium hydroxide in 1 ml. of water. The reaction mixture is then poured into ice water and the solid which forms collected by filtration, washed with water to neutrality, and dried to yield 7α-difluoromethylestra-4,9(10),11-trien-17β-ol-3-one which is recrystallized from methylene chloride:ether.

A solution of 6 g. of 7α-difluoromethylestra-4,9(10),11-trien-17β-ol-3-one in 120 ml. of pyridine is added to a mixture of 6 g. of chromic trioxide in 20 ml. of pyridine. The reaction mixture is allowed to stand at room temperature for 15 hours, diluted with ethyl acetate, and filtered through Celite diatomaceous earth. The filtrate is washed well with water, dried, and evaporated to dryness to yield 7α-difluoromethylestra - 4,9(10),11 - trien - 3,17-dione which may be further purified by recrystallization from acetone:hexane.

Similarly, 7α-difluoromethyl-18-methylestra-4,9(10),11-trien-3,17-dione is prepared from 7α-difluoromethyl-17β-acetoxy-18-methylestra-4,9(10),11-trien-3-one.

Example 9

A mixture of 2 g. of 7α-difluoromethylestra-4,9(10)-diene-3,17-dione, 150 ml. of dry benzene, 18 ml. of ethylene glycol, and 40 mg. of oxalic acid monohydrate is refluxed for 18 hours under a nitrogen atmosphere. The reaction mixture is then washed with aqueous sodium bicarbonate solution and water, dried, and evaporated to dryness to yield 3,3-ethylenedioxy-7α-difluoromethylestra-4,9(10)-dien-17-one which is recrystallized from acetone:hexane.

Similar to this procedure are prepared 3,3-ethylenedioxy-7α-difluoromethyl-18-methylestra - 4,9(10),11 - trien-17-one; 3,3 - ethylenedioxy - 7α - difluoromethylestra-4,9(10),11-trien-17-one; and 3,3-ethylenedioxy-7α-difluoromethyl-18-methylestra-4,9(10),11-trien-17-one.

Example 10

A solution of 1 g. of sodium borohydride in 3 ml. of water is added to an ice-cooled solution of 1 g. of 3,3-ethylenedioxy-7α-difluoromethylestra-4,9(10)-dien-17-one in 120 ml. of methanol and the mixture is then allowed to stand for 16 hours at room temperature. The excess reagent is decomposed by addition of acetic acid and the solution is then concentrated to a small volume in vacuum and diluted with water. The product is extracted with ethyl acetate and these extracts are washed with water, dried and evaporated to yield, 3,3-ethylenedioxy-7α-difluoromethylestra-4,9(10)-dien-17β-ol which may be further purified by recrystallization from acetone:hexane.

In a similar fashion, 3,3-ethylenedioxy-7α-difluoromethyl-18-methylestra-4,9(10)-dien-17β-ol; 3,3-ethylenedioxy-7α-difluoromethylestra-4,9(10),11-trien-17β-ol; and 3,3-ethylenedioxy-7α-difluoromethyl - 18-methylestra-4,9(10),11-trien-17β-ol are obtained from the corresponding 17-keto steroids.

A mixture of 0.5 g. of 3,3-ethylenedioxy-7α-difluoromethylestra-4,9(10)-dien-17β-ol in 25 ml. of acetone and 0.1 ml. of concentrated hydrochloric acid is allowed to stand at room temperature for 15 hours and is then poured into water. This mixture is extracted with methylene chloride and the extracts are in turn washed with water to neutrality, dried over sodium sulfate and evaporated to dryness, to yield 7α-difluoromethylestra-4,9(10)-dien-17β-ol-3-one which may be recrystallized from acetone:hexane.

By following the procedure of this example, 7α-difluoromethyl-18-methylestra-4,9(10)-dien-17β-ol-3 - one; 7α-difluoromethylestra-4,9(10),11-trien-17β-ol-3-one; and 7α-difluoromethyl-18-methylestra-4,9(10),11-trien - 17β - ol-3-one are prepared from 3,3-ethylenedioxy-7α-difluoromethyl-18-methylestra-4,9(10)-dien-17-one; 3,3-ethylenedioxy-7α-difluoromethylestra-4,9(10),11-trien-17-one; and 3,3-ethylenedioxy-7α-difluoromethyl - 18-methylestra-4,9(10),11-trien-17-one, respectively.

Example 11

Two milliliters of dihydropyran are added to a solution of 1 g. of 7α-difluoromethylestra-4,9(10)-dien-17β-ol-3-one in 15 ml. of benzene. About 1 ml. is removed by distillation to remove moisture and 0.4 g. of p-toluenesulfonic acid is added to the cooled solution. This mixture is allowed to stand at room temperature for 4 days, and is then washed with aqueous sodium carbonate solution and water, dried, and evaporated. The residue is chromatographed on neutral alumina, eluting with hexane, to yield 7α-difluoromethyl - 17β - tetrahydropyranyloxyestra-4,9(10)-dien-3-one.

Similar to this procedure, the 17β-tetrahydropyranyloxy ethers of 7α-difluoromethyl-18-methylestra-4,9(10)-dien-17β - ol - 3 - one, 7α-difluoromethylestra-4,9(10),11-trien-17β-ol-3-one, and 7α-difluoromethyl-18-estra-4,9(10),11-trien-17β-ol-3-one are prepared.

Example 12

A mixture of 2 g. of 7α-difluoromethylestra-4,9(10)-dien-17β-ol-3-one in 8 ml. of pyridine and 4 ml. of adamantoyl chloride is heated at steam bath temperatures for one hour. The mixture is then poured into ice water and the solid which forms is collected by filtration, washed with water, and dried to yield 7α-difluoromethyl-17β-adamantoyloxyestra-4,9(10)-dien-3-one which is further purified through recrystallization from methylene chloride:hexane.

Similarly, 7α-difluoromethyl - 17β - adamantoyloxy-18-methylestra-4,9(10)-dien-3-one, 7α-difluoromethyl - 17β-adamantoyloxyestra-4,9(10),11-trien-3-one, and 7α-difluoromethyl-17β-adamantoyloxy-18-methylestra-4,9(10),11-trien-3-one are prepared.

Example 13

A mixture of 1 g. of 7α-difluoromethylestra-4,9(10)-dien-17β-ol-3-one, 4 ml. of pyridine, and 2 ml. of acetic anhydride is allowed to stand at room temperature for 15 hours. The mixture is then poured into ice water and the solid which forms is collected by filtration, washed with water, and dried to yield 7α-difluoromethyl-17β-acetoxyestra-4,9(10)-dien-3-one which may be further purified through recrystallization from acetone:hexane.

In a like manner, 7α-difluoromethyl-17β-acetoxy-18-methylestra-4,9(10)-dien-3-one, 7α-difluoromethyl-17β-acetoxyestra-4,9(10),11-trien-3-one, and 7α-difluoromethyl-17β-acetoxy-18-methylestra-4,9(10),11-trien-3-one are prepared.

*Example 14*

A solution of 5 g. of 3,3-ethylenedioxy-7α-difluoromethylestra-4,9(10)-dien-17-one in 250 ml. of thiophen-free benzene is treated with an equimolar amount of methylmagnesium bromide in anhydrous conditions for 3 hours, cooled, and cautiously treated with excess aqueous ammonium chloride solution. This mixture is then extracted with ethyl acetate and these extracts are in turn washed with water, dried over sodium sulfate and evaporated to dryness to yield 3,3-ethylenedioxy-7α-difluoromethyl-17α-methylestra-4,9(10)-dien-17β-ol which is recrystallized from methylene chloride:hexane.

3,3 - ethylenedioxy - 7α - difluoromethyl - 17α,18 - dimethylestra-4,9(10)-dien-17β-ol, 3,3-ethylenedioxy-7α-difluoromethyl-17α-methylestra-4,9(10),11-trien-17β-ol, and 3,3 - ethylenedioxy - 7α-difluoromethyl-17α,18-dimethylestra-4,9(10),11-trien-17β-ol are prepared, in a similar fashion.

Hydrolysis of these products with acid by the procedure outlined in the third paragraph of Example 10 affords the corresponding 3-keto steroids.

*Example 15*

To a stirred solution of 2 g. of 3,3-ethylenedioxy-7α-difluoromethylestra-4,9(10)-dien-17-one in 250 ml. of absolute ether is added in a dropwise fashion and under nitrogen, an ethereal solution of 10 molar equivalents of ethyl lithium. The mixture is then stirred for 48 hours at room temperature, poured into water, acidified with hydrochloric acid, and stirred vigorously for 1 hour. The ethereal phase is separated, washed with water to neutrality, dried over sodium sulfate, and evaporated to dryness to yield 3,3-ethylenedioxy-7α-difluoromethyl-17α-ethylestra-4,9(10)-dien-17β-ol which is further purified through recrystallization from acetone:hexane.

Hydrolysis with acid by the procedure of the third paragraph of Example 10 affords 7α-difluoromethyl-17α-ethylestra-4,9(10)-dien-17α-ol-3-one.

Similarly, 7α - difluoromethyl - 17α - ethyl - 18 - methylestra - 4,9(10) - dien - 17β-ol-3-one, 7α-difluoromethyl-17α-ethylestra-4,9(10),11-trien-17β-ol-3-one, and 7α-difluoromethyl - 17α - ethyl-18-methylestra-4,9(10),11-trien-17β-ol-3-one are prepared.

*Example 16*

A solution of 8.5 g. of 1,2-dichloroethylene in 50 ml. of anhydrous ether is added in a dropwise fashion, under nitrogen and at 0° C. over a 30 minute period to a stirred solution of 0.5 g. of 3,3-ethylenedioxy-7α-difluoromethylestra-4,9(10)-dien-17-one in 20 ml. of anhydrous ether is added in a dropwise fashion with stirring over a 15 minute period. Stirring at room temperature is continued for 18 hours, and the reaction mixture is then poured into ice water and extracted with ether. These extracts are washed with water, dried over sodium sulfate, and concentrated under reduced pressure. The residue is chromatographed on alkaline alumina with 8:2 hexane:ether to yield 3,3-ethylenedioxy-7α-difluoromethyl-17α-chloroethynylestra-4,9(10)-dien-17β-ol which is further purified through recrystallization from acetone:hexane.

Hydrolysis with acid by the procedure of the third paragraph of Example 10 affords 7α-difluoromethyl-17α-chloroethynylestra-4,9(10)-dien-17β-ol-3-one.

Similarly, 7α - difluoromethyl - 17α-chloroethynyl-18-methylestra - 4,9(10)-dien-17β-ol-3-one, 7α-difluoromethyl - 17α-chloroethynyl-4,9(10),11-trien-17β-ol-3-one, and 7α - difluoromethyl - 17α - chloroethynyl-18-methylestra-4,9(10),11-trien-17β-ol-3-one are prepared.

*Example 17*

A solution of 1 g. of 3,3-ethylenedioxy-7α-difluoromethylestra-4,9(10)-dien-17-one in 30 ml. of anhydrous benzene is added under nitrogen to a solution of 1.4 g. of potassium in 30 ml. of t-amyl alcohol. A slow current of purified acetylene is then passed through the solution for 40 hours. The mixture is diluted with water and extracted with benzene. These extracts are washed with water to neutrality, dried over sodium sulfate and evaporated. Chromatography of the residue on alkaline alumina with 2:3 hexane:benzene yields 3,3-ethylenedioxy-7α - difluoromethyl - 17α - ethynylestra-4,9(10)-dien-17β-ol which is recrystallized from acetone:hexane.

Acid hydrolysis following the procedure of the third paragraph of Example 10 affords 7α-difluoromethyl-17α-ethynylestra-4,9(10)-dien-17β-ol-3-one.

Similarly prepared are 7β-difluoromethyl-17α-ethynyl-18 - methylestra - 4,9(10)-dien-17β-ol-3-one, 7α-difluoromethyl - 17α - ethynylestra-4,9(10),11-trien-17α-ol-3-one, and 7α - difluoromethyl - 17α - ethynyl - 18 - methylestra-4,9(10),11-trien-17β-ol-3-one.

*Example 18*

A mixture of 1 g. of 7α-difluoromethyl-17α-ethynylestra-4,9(10)-dien-17β-ol-3-one, 1 g. of p-toluenesulfonic acid monohydrate, 50 ml. of acetic acid, and 25 ml. of acetic anhydride is allowed to stand at room temperature for 24 hours, and then poured into water and stirred. This mixture is then extracted with methylene chloride and these extracts are dried and evaporated to yield 7α-difluoromethyl - 17α - ethynyl - 17β-acetoxyestra-4,9(10)-dien-3-one which is recrystallized from acetone:ether.

Likewise prepared are 7α-difluoromethyl-17α-ethynyl-17β - acetoxy - 18 - methylestra-4,9(10)-dien-3-one, 7α-difluoromethyl - 17α - ethynyl-17β-acetoxyestra-4,9(10), 11 - trien-3-one, and 7α-difluoromethyl-17α-ethynyl-17β-acetoxy - 18 - methylestra-4,9(10),11-trien-3-one.

In a similar manner, the other 17α-aliphatic-17β-ols of this invention are converted to the corresponding 17β-acetates.

The use of propionic anhydride in lieu of acetic anhydride in the foregoing procedure yields the corresponding 17β-propionyloxy steroids.

*Example 19*

A solution of 1 g. of 3,3-ethylenedioxy-7α-difluoromethyl - 17α - ethynylestra-4,9(10)-dien-17β-ol in 40 ml. of pyridine is hydrogenated at 25° C. atmospheric pressure in the presence of 0.4 g. of prehydrogenated 2% palladium-on-calcium carbonate. When 1.1 molar equivalents of hydrogen are absorbed, the reaction is stopped. The catalyst is removed by filtration through Celite diatomaceous earth and washed with ethyl acetate and the combined filtrate and washings are evaporated to dryness under reduced pressure. The residue is dissolved in ethyl acetate and this solution then washed with dilute hydrochloric acid and water to neutrality, dried, and evaporated to dryness to yield 3,3-ethylenedioxy-7α-difluoromethyl - 17α - vinylestra - 4,9(10)-dien-17β-ol which is further purified through recrystallization from acetone.

Acid hydrolysis of this compound by the procedure of the third paragraph of Example 10 yields 7α-difluoromethyl-17α-vinylestra-4,9(10)-dien-17β-ol-3-one.

Also prepared by the procedure of this example are 7α-difluoromethyl-17α-vinyl - 18 - methylestra - 4,9(10)-dien-17β-ol-3-one, 7α-difluoromethyl - 17α - vinylestra-4,9(10),11-trien-17β-ol-3-one, and 7α-difluoromethyl-17α-vinyl-18-methylestra-4,9(10),11-trien-17β-ol-3-one.

*Example 20*

A solution of 3 g. of 3,3-ethylenedioxy-7α-difluoromethyl-17α-ethynylestra-4,9(10)-dien-17β-ol in 125 ml. of dioxane is hydrogenated at 25° C./570 mm. with 0.5 g. of pre-hydrogenated 10% palladium-on-charcoal. Upon the consumption of the theoretical amount of hydrogen, the solution is filtered and the filtrate evaporated to dryness under reduced pressure to yield 3,3-ethylenedioxy-7α-difluoromethyl-17α-ethylestra-4,9(10)-dien-17β-ol which is recrystallized from acetone.

Acid hydrolysis by the procedure of the third paragraph of Example 10 yields 7α-difluoromethyl-17α-ethylestra-4,9(10)-dien-17β-ol-3-one.

Also prepared by the procedure of this example are 7α-difluoromethyl-17α-ethyl - 18 - methylestra - 4,9(10)-dien-17β-ol-3-one, 7α-difluoromethyl - 17α - ethylestra-4,9(10),11-trien-17β-ol-3-one, and 7α-difluoromethyl-17α-ethyl-18-methylestra-4,9(10), 11-trien-17β-ol-3-one.

*Example 21*

A mixture of 7 g. of methylene iodide and 3 g. of zinc-copper couple in 15 ml. of anhydrous ether is heated at reflux under nitrogen for 3 hours. The mixture is then cooled and 2 g. of 7α-difluoromethyl-17α-vinylestra-4,9(10)-dien-17β-ol-3-one are added. This mixture is allowed to stand at room temperature for 2 hours and is then poured into 200 ml. of 2% aqueous sodium carbonate and extracted twice with 100 ml. portions of ether. These extracts are dried over sodium sulfate and evaporated under reduced pressure. The residue is held at 0.01 mm. to remove any unreacted methylene iodide and then recrystallized from hexane to yield 7α-difluoromethyl-17α-cyclopropylestra-4,9(10)-dien-17β-ol-3-one.

Similarly prepared are 7α-difluoromethyl-17α-cyclopropyl-18-methylestra-4,9(10)-dien-17β-ol-3-one, 7α-difluoromethyl-17α-cyclopropylestra-4,9(10),11-trien-17β - ol - 3-one, and 7α-difluoromethyl-17α-cyclopropyl-18-methylestra-4,9(10),11-trien-17β-ol-3-one.

*Example 22*

A solution of 1 g. of 7α-difluoromethyl-17α-ethylestra-4,9(10)-dien-17β-ol-3-one in 50 ml. of tetrahydrofuran is added over a 30 minute period to a stirred suspension of 1 g. of lithium aluminum hydride in 50 ml. of anhydrous tetrahydrofuran and this mixture is heated at reflux for 2 hours. To the mixture are cautiously added 5 ml. of ethyl acetate and 2 ml. of water. Sodium sulfate is next added, the mixture is filtered and the solid thus collected is washed with hot ethyl acetate. The combined organic solutions are then evaporated to yield 7α-difluoromethyl-17α-ethylestra-4,9(10)-dien-3β,17β-diol which may be further purified through recrystallization from acetone:hexane. The other 3-keto-17-substituted steroids of this invention are similarly reduced to the corresponding 3-hydroxy steroids.

*Example 23*

7α-difluoromethyl-17β-acetoxyestra-4,9(10) - dien - 3-one is reduced according to the procedure of Example 22 yielding 7α-difluoromethyl-17β-acetoxyestra-4,9(10)-dien-3β-ol.

Two milliliters of dihydropyran are added to a solution of 1 g. of 7α-difluoromethyl-17β-acetoxyestra-4,9(10)-dien-3β-ol in 15 ml. of benzene. About 1 ml. is removed by distillation to remove moisture and 0.4 g. of p-toluenesulfonyl chloride is added to the cooled solution. This mixture is allowed to stand at room temperature for four days, and is then washed with aqueous sodium carbonate solution and water, dried, and evaporated. The residue is chromatographed on neutral alumina, eluting with hexane, to yield 3β-tetrahydropyranyloxy-7α-difluoromethyl-17β-acetoxyestra-4,9(10)-diene which is recrystallized from pentane.

A solution of 1 g. of 3β-tetrahydropyranyloxy-7α-difluoromethyl-17β-acetoxyestra-4,9(10)-diene in 50 ml. of methanol is heated at reflux for 3 hours with a solution of potassium hydroxide in 1 ml. of water. The reaction mixture is then poured into ice water and the solid which forms is collected by filtration, washed with water to neutrality, and dried to yield 3β-tetrahydropyranyloxy-7α-difluoromethylestra-4,9(10)-dien-17β-ol which is recrystallized from methylene chloride:ether.

By a similar procedure as outlined in this example, 3β-tetrahydropyranyloxy-7α-difluoromethyl-18 - methylestra-4,9(10)-dien-17β-ol, 3β-tetrahydropyranyloxy-7α-difluoromethylestra-4,9(10),11-trien-17β-ol, and 3β-tetrahydropyranyloxy-7α-difluoromethyl-18-methylestra - 4,9(10),-11-trien-17β-ol are prepared. 3β-tetrahydropyranyloxy-7α - difluoromethyl-17α-ethynylestra-4,9(10)-dien-17β-ol and 3β - tetrahydropyranyloxy-7α-difluoromethyl-17α-ethynylestra-4,9(10),11-trien-17β-ol are prepared in accordance herewith from 7α-difluoromethyl-17α-ethynyl-17β-acetoxyestra-4,9(10)-dien-3-one and 7α-difluoromethyl-17α - ethynyl-17β-acetoxyestra-4,9(10),11-trien-3-one, respectively. The other 3β-tetrahydropyranyloxy-17 substituted steroids are likewise prepared by the procedure of this example.

The 3β,17β-bis-tetrahydropyranyl ethers of the corresponding 3β,17β-diols are thus prepared by using double the molar quantity of dihydropyran.

*Example 24*

7α - difluoromethyl - 17α - ethynyl - 17β - acetoxyestra-4,9(10)-dien-3-one is reduced with lithium aluminum hydride according to the procedure of Example 22 yielding the corresponding 3β-ol.

A mixture of 1 g. of 7α-difluoromethyl-17α-ethynyl-17β-acetoxyestra-4,9(10)-dien-3β-ol, 1 g. of p-toluenesulfonic acid monohydrate, 50 ml. of acetic acid and 25 ml. of acetic anhydride is allowed to stand at room temperature for 24 hours, and then poured into water and stirred. This mixture is then extracted with methylene chloride and these extracts are dried and evaporated to yield 3β,17β - diacetoxy - 7 α- difluoromethyl-17α-ethynylestra-4,9(10)-diene.

Similarly, the other 3β-hydroxy-17-substituted steroids of this invention are converted to the corresponding steroids of this invention are converted to the corresponding steroids having the 3β-acetoxy group.

The procedures of the foregoing examples may be used to treat the corresponding steroids containing the 7α-dichloromethyl group, the 7α-fluoromethyl group, or the 7α-chloromethyl group in lieu of the 7α-difluoromethyl group illustrated therein.

What is claimed is:

1. Steroids of the formula

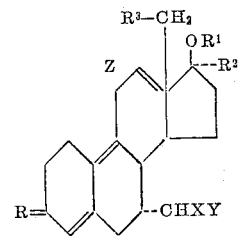

wherein R is an oxygen atom or the group

in which $R^4$ is hydrogen, tetrahydropyranyl, or a hydrocarbon carboxylic acyl group of less than 12 carbon atoms;

$R^1$ is hydrogen, tetrahydropyranyl, or a hydrocarbon carboxylic acyl group of less than 12 carbon atoms;

$R^2$ is hydrogen, cyclopropyl, (lower)alkyl, (lower)alkenyl, (lower alkynyl, or a halo(lower)alkynyl group;

$R^3$ is hydrogen or methyl;

Z is a carbon-carbon single bond or a carbon-carbon double bond;

X is hydrogen, chloro, or fluoro; and

Y is chloro or fluoro.

2. Steroids of claim 1 wherein $R^1$, $R^2$ and $R^3$ are as therein defined;
R is an oxygen atom;
Z is a carbon-carbon single bond; and
each of X and Y is fluoro.
3. Steroids of claim 1 wherein $R^1$, $R^2$ and $R^3$ are as therein defined;
R is an oxygen atom;
Z is a carbon-carbon double bond; and
each of X and Y is fluoro.
4. A steroid of claim 1 wherein
R is an oxygen atom;
$R^1$ is hydrogen;
$R^2$ is methyl;
$R^3$ is hydrogen;
Z is a carbon-carbon single bond; and
each of X and Y is fluoro.
5. A steroid of claim 1 wherein
R is an oxygen atom;
$R^1$ is hydrogen;
$R^2$ is methyl;
$R^3$ is hydrogen;
Z is a carbon-carbon double bond; and
each of X and Y is fluoro.
6. A steroid of claim 1 wherein
R is an oxygen atom;
$R^1$ is hydrogen;
$R^2$ is ethyl;
$R^3$ is methyl;
Z is a carbon-carbon single bond; and
each of X and Y is fluoro.
7. A steroid of claim 1 wherein
R is an oxygen atom;
$R^1$ is hydrogen;
$R^2$ is ethyl;
$R^3$ is methyl;
Z is a carbon-carbon double bond; and
each of X and Y is fluoro.
8. A steroid of claim 1 wherein
R is an oxygen atom;
$R^1$ is hydrogen;
$R^2$ is ethynyl;
$R^3$ is methyl;
Z is a carbon-carbon single bond; and
each of X and Y is fluoro.
9. A steroid of claim 1 wherein
R is an oxygen atom;
$R^1$ is hydrogen;
$R^2$ is ethynyl;
$R^3$ is methyl;
Z is a carbon-carbon double bond; and
each of X and Y is fluoro.
10. A steroid of claim 1 wherein
R is the group

in which $R^4$ is acetyl;
$R^1$ is acetyl;
$R^2$ is ethynyl;
$R^3$ is hydrogen;
Z is a carbon-carbon single bond; and
each of X and Y is fluoro.
11. A steroid of claim 1 wherein
R is the group

in which $R^4$ is acetyl;
$R^1$ is acetyl;
$R^2$ is ethynyl;
$R^3$ is hydrogen;
Z is a carbon-carbon double bond; and
each of X and Y is fluoro.

12. A steroid of claim 1 wherein
R is an oxygen atom;
$R^1$ is adamantoyl;
$R^2$ is hydrogen;
$R^3$ is methyl;
Z is a carbon-carbon single bond; and
each of X and Y is fluoro.
13. A steroid of claim 1 wherein
R is an oxygen atom;
$R^1$ is adamantoyl;
$R^2$ is hydrogen;
$R^3$ is methyl;
Z is a carbon-carbon double bond; and
each of X and Y is fluoro.
14. A steroid of claim 1 wherein
R is an oxygen atom;
$R^1$ is tetrahydropyranyl;
$R^2$ is hydrogen;
$R^3$ is methyl;
Z is a carbon-carbon single bond; and
each of X and Y is fluoro.
15. A steroid of claim 1 wherein
R is an oxygen atom;
$R^1$ is tetrahydropyranyl;
$R^2$ is hydrogen;
$R^3$ is methyl;
Z is a carbon-carbon double bond; and
each of X and Y is fluoro.
16. A steroid of claim 1 wherein
R is the group

in which $R^4$ is tetrahydropyranyl;
$R^1$ is hydrogen;
$R^2$ is ethynyl;
$R^3$ is hydrogen;
Z is a carbon-carbon single bond; and
each of X and Y is fluoro.
17. A steroid of claim 1 wherein
R is the group

in which $R^4$ is tetrahydropyranyl;
$R^1$ is hydrogen;
$R^2$ is ethynyl;
$R^3$ is hydrogen;
Z is a carbon-carbon double bond; and
each of X and Y is fluoro.
18. A steroid of claim 1 wherein
R is an oxygen atom;
$R^1$ is acetyl;
$R^2$ is ethynyl;
$R^3$ is hydrogen;
Z is a carbon-carbon single bond; and
each of X and Y is fluoro.
19. A steroid of claim 1 wherein
R is an oxygen atom;
$R^1$ is acetyl;
$R^2$ is ethynyl;
$R^3$ is hydrogen;
Z is a carbon-carbon double bond; and
each of X and Y is fluoro.

References Cited

UNITED STATES PATENTS 3,200,113  8/1965  Christiansen et al. __ 260—239.5

LEWIS GOTTS, *Primary Examiner.*

H. FRENCH, *Assistant Examiner.*

UNITED STATES PATENT OFFICE
CERTIFICATE OF CORRECTION

Patent No. 3,357,975                    December 12, 1967

Colin C. Beard et al.

It is hereby certified that error appears in the above numbered patent requiring correction and that the said Letters Patent should read as corrected below.

Column 2, lines 60 to 70, the formula should appear as shown below instead of as in the patent:

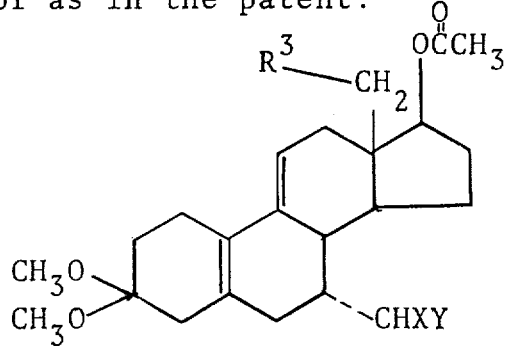

column 3, lines 5 to 15, the formula should appear as shown belc instead of as in the patent:

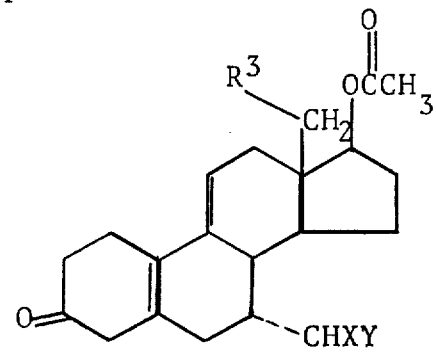

same column lines 32 to 42, the formuly should appear as show below instead of as in the patent:

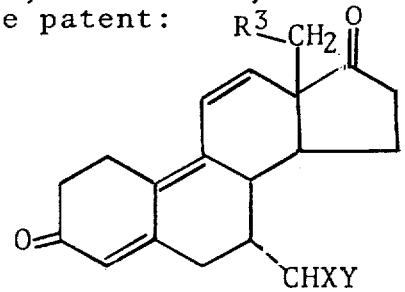

column 12, lines 39 and 40, strike out "of this invention are converted to the corresponding steroids having the 3β-acetoxy group" and insert instead -- having the 3β-acetoxy group --; same column 12, lines 48 to 57, the formula should appear as shown below instead of as in the patent:

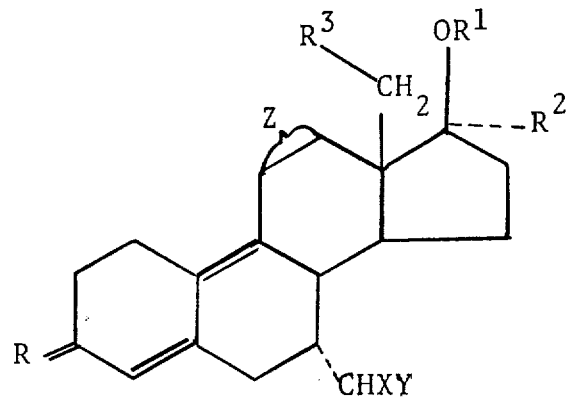

Signed and sealed this 15th day of April 1969.

(SEAL)
Attest:

EDWARD M. FLETCHER, JR.
Attesting Officer

EDWARD J. BRENNER
Commissioner of Patents